Aug. 18, 1970     F. A. CALLIES     3,524,332
ELASTOMER COUPLING
Filed Sept. 6, 1968     2 Sheets-Sheet 1
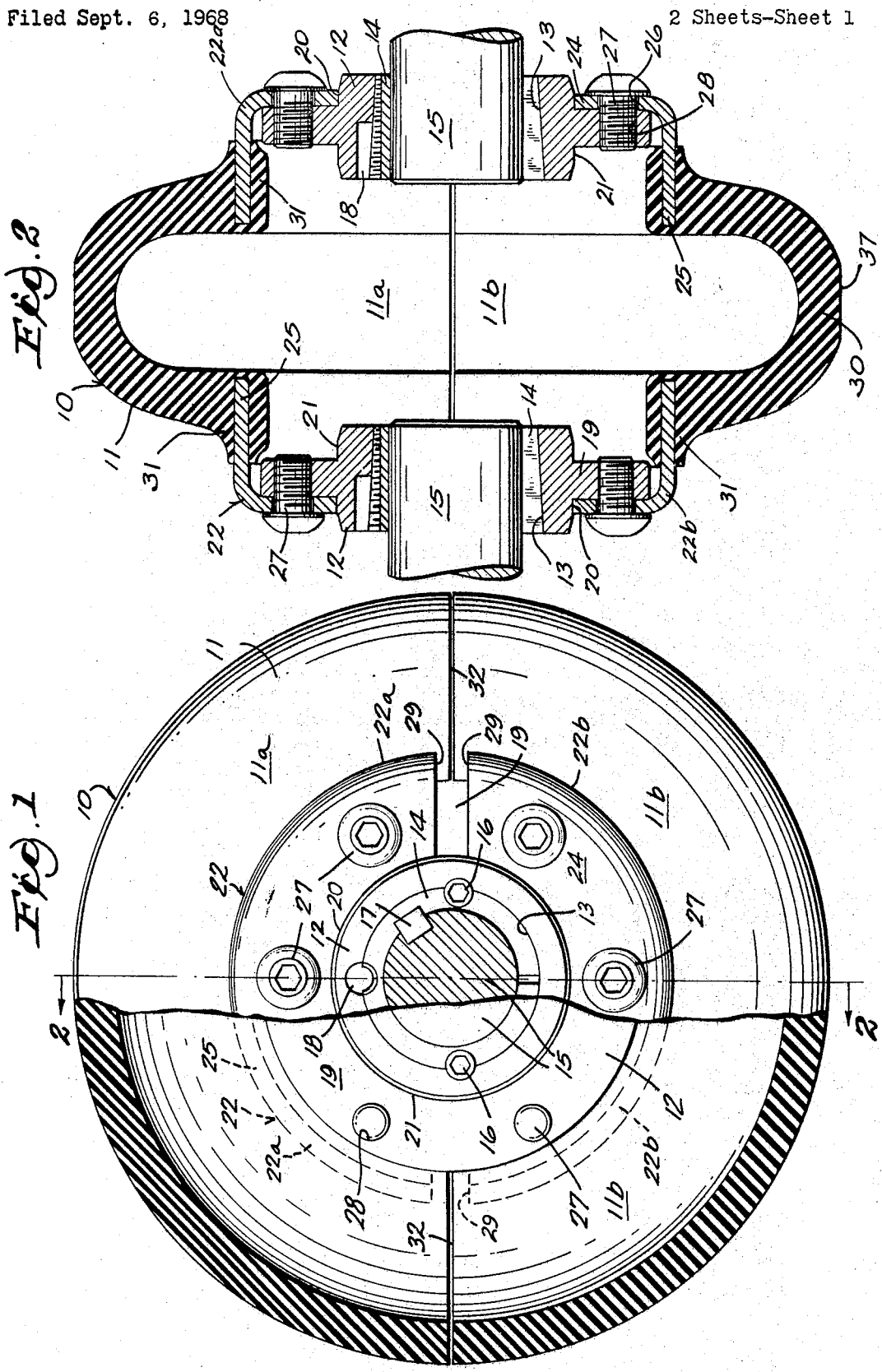

Aug. 18, 1970   F. A. CALLIES   3,524,332
ELASTOMER COUPLING
Filed Sept. 6, 1968   2 Sheets-Sheet 2
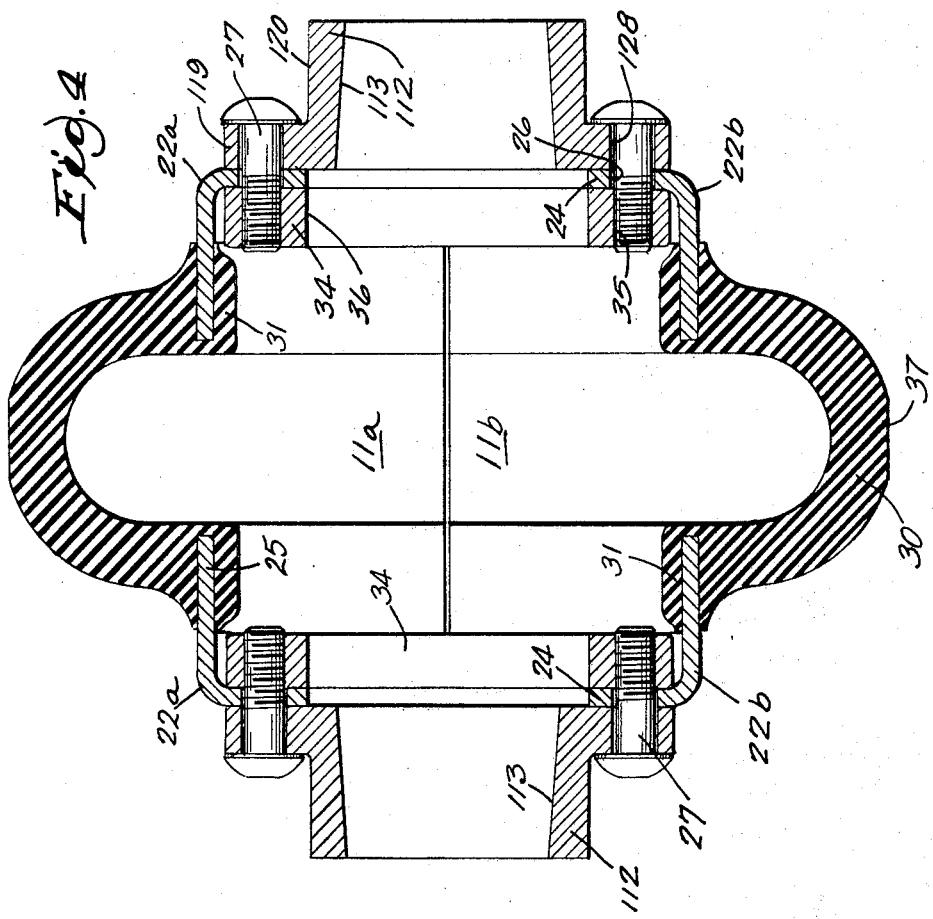
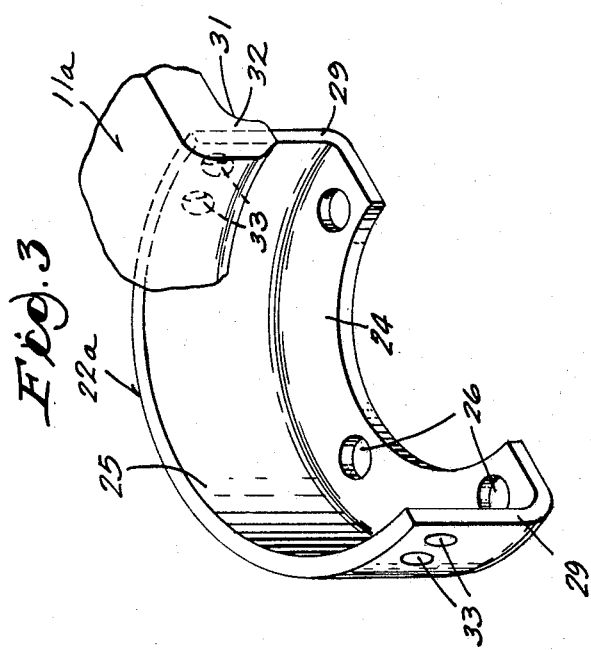

United States Patent Office 3,524,332
Patented Aug. 18, 1970

3,524,332
ELASTOMER COUPLING
Fritz A. Callies, Menomonee Falls, Wis., assignor to Rex Chainbelt Inc., Milwaukee, Wis., a corporation of Wisconsin
Filed Sept. 6, 1968, Ser. No. 758,016
Int. Cl. F16d 3/52, 3/14
U.S. Cl. 64—11                             6 Claims

ABSTRACT OF THE DISCLOSURE

An elastomer coupling has an annular elastomer element joining the shaft-mounted hubs of the coupling by a combination of chemical bonding and mechanical locking of the elastomer material. The elastomer element is secured at each end to an annular L-ring and the L-ring is attached to the face of its hub. The element and L-rings secured thereto are split to facilitate assembly of the coupling and replacement of the elastomer element.

BACKGROUND OF THE INVENTION

Field of invention

The present invention relates to flexible shaft couplings and more particularly to couplings wherein the flexible portion is an annular elastomer element forming a yieldable intermediary joining a pair of shaft-mounted hubs.

Description of the prior art

Flexible shaft couplings employing an annular elastomer element are known in the art. These couplings are of two general types, namely, those in which the elastomer element is mechanically clamped to the associated hubs and those in which the element is chemically bonded to the hubs or to other intermediate elements. Examples of the respective general types in the prior art are shown in U.S. Letters Patent No. 3,385,080 entitled Flexible Shaft Coupling issued May 28, 1968, and U.S. Letters Patent No. 3,250,090 entitled Coupling issued May 10, 1966.

Couplings of the prior art in which the elastomer element is mechanically clamped to the hubs have all generally exhibited the same problems. Since the clamping is usually effected by means of bolts or similar fasteners, bulky and often complex machined jaws or clamps are required. These substantially complicate the manufacture and installation of the coupling. Also, clamping the elastomer element causes a non-uniform stress distribution in the element with areas of undesirable stress concentration.

Where the elastomer element is bonded to the coupling hubs or to intermediate elements attached to the hubs, one of the most important considerations is to provide a uniform bonding surface of sufficient area. It is known in the prior art to bond the elastomer element directly to the shaft-mounted hubs. However, excessively large and more costly hubs are needed to provide the required bonding area. Additionally, and particularly in larger size couplings, replacement of the flexible elastomer element, which may be occasioned by deterioration or other failure, also necessitates replacement of the hubs.

It is known in the art to bond the elastomer element to an intermediate annular member which is in turn attached mechanically to the hub. This allows a reduction in hub size and provides for less costly replacement of the elastomer element. Two important limitations are apparent in the prior art structures wherein an intermediate member, typically in the form of a ring, is used. In one prior art coupling in which the intermediate ring is attached to the hub by axially disposed bolts, the bonding area available is extremely limited. In another prior art structure, the bonding area limitation is overcome by attaching a cylindrical ring to the hub with radially disposed bolts, however, radially drilled and tapped holes in the hub are difficult and costly to machine. Radially disposed bolts or cap screws are also more difficult to keep tight, being subject to variations in tension due to centrifugal force fluctuations associated with rotational speed changes.

To facilitate assembly and disassembly of an elastomer coupling, it is known to form the annular elastomer element in two identical semicircular segments and to correspondingly split the intermediate rings to which the elastomer is bonded. It has been found that in operation the bond of the elastomer element to the metal ring tends to fail first at the ends of the semicircular segments and rings. Failure usually occurs as a peeling of the elastomer from the metal caused by heat and stresses generated with flexing of the elastomer.

SUMMARY OF THE INVENTION

The present invention is directed to providing an elastomer coupling wherein the flexible elastomer element is secured to a pair of hub-mouned L-rings by a combination of chemical bonding and mechanical locking. The element is bonded to both sides of the axial legs of the L-rings. The mechanical locking includes wrapping the ends of the semicircular elastomer element around the ends of the axial legs of the nearly semicircular metal L-rings to which it is bonded. A portion of the elastomer element is also caused to flow through holes selectively placed in the legs to thereby provide an additional mechanical locking or keying of the elastomer to the ring independent of the chemical bond.

The L-rings provide an optimum means of interconnecting the elastomer and the hubs. Each ring is attached by its radial leg to the hub by axially disposed threaded fastening means such as, for example, cap screws. The axial leg provides a substantial area to which the entire circumference of the elastomer element is bonded by molding and, in particular, provides a double bonding surface for interlocking of the elastomer material.

The structure of the present invention also permits the use of lighter and more compact hubs. The cost of the hubs is thus reduced and there is a substantial reduction in the weight of the coupling.

BRIEF DESCRIPTION OF THE DRAWINGS

FIG. 1 is an axial view, partly in section, of the coupling of the present invention.

FIG. 2 is a vertical sectional view taken on line 2—2 of FIG. 1.

FIG. 3 is a perspective view of the L-ring segment which forms half of the interconnecting means between each hub and the elastomer element, a portion of which is shown bonded and locked to one end of the ring.

FIG. 4 is a view similar to FIG. 2 showing an alternate embodiment of the invention, particularly adapted for use as a spacer coupling.

DESCRIPTION OF THE PREFERRED EMBODIMENT

The shaft coupling 10 of the present invention is of the type having an annular elastomer element 11 which forms the flexible torque-transmitting interconnection between a pair of shaft-mounted hubs 12. In its preferred form, to facilitate installation and replacement, the elastomer element 11 is molded in two semicircular sections 11a and 11b. The interconnection of the elastomer element and the hubs will be hereinafter described in greater detail.

Each of the hubs 12 has a suitable bore adapted to receive a shaft 15. In its preferred form, a tapered bore 13 is adapted to receive a standard split tapered bushing 14. The bushing 14 secures the hub 12 to the shaft 15 by means of the associated set screws 16 and shaft key 17, in a manner well-known in the art and as disclosed, for example, in U.S. Letters Patent No. 2,402,743. As also disclosed therein, a demounting or jackscrew hole 18 may be provided to aid in separating the bushing from the hub for disassembly.

Each hub 12 has an integral peripheral flange 19 which has a width or axial dimension substantially less than the width of the central bored portion of the hub. The flange 19 is positioned so as to define an annular shoulder 20 on the outer face of the hub. The flange 19 may be disposed centrally of the hub 12 so as to also define a second annular shoulder 21 on the other face of the hub. Thus, as can be seen particularly in FIG. 2, a hub 12 having identical annular shoulders 20 and 21 may be reversibly mounted to a shaft in either direction to provide for insertion of the tapered bushing 14 from the most convenient side.

A pair of L-rings 22 forms the intermediate connecting means between the elastomer element 11 and the hubs 12. Each L-ring is split to form a pair of substantially semicircular L-ring segments 22a and 22b which are attached to the flange 19. One leg 24 of the L-ring segment 22a or 22b is seated in radially disposed position on the annular shoulder 20 such that its other leg 25 extends axially over the periphery of the flange 19. Leg 24 has a series of circumferentially spaced clearance holes 26 adapted to receive cap screws 27 or other fasteners which are threaded into a correspondingly spaced series of tapped holes 28 in the flange 19 to demountably secure the L-ring segment 22a or 22b thereto. A pair of segments 22a and 22b is attached to each hub 12 to form a substantially closed L-ring 22. The ends 29 of the semicircular L-ring segments 22a and 22b, however, lie spaced apart slightly as is best shown in FIG. 1.

Referring particularly to FIG. 2, the elastomer element 11, which may be formed, for example, of polyurethane, neoprene, or similar resilient material, has an arcuate transverse cross-section. The intermediate outer peripheral portion 30 is preferably of substantially semicircular cross-section and uniform thickness. The outer surface of the intermediate portion 30 may, however, be flattened as at 37 primarily for the sake of appearance, and such flattening does not adversely affect the properties of the elastomer element 11 or the operation of the coupling. The intermediate portion 30 extends into flared edge portions defining semicylindrical laterally projecting flanges 31 which provide the necessary increased axial length and cross-sectional thickness for adequate bonding of the elastomer element to the axial legs 25 of the L-rings 22.

The elastomer element 11 is bonded to the L-rings in the molding process by which it is formed. For the reasons stated previously, the annular elastomer element 11 is molded in two identical semicircular sections 11a and 11b. The laterally projecting flanges 31 of each section 11a and 11b are molded around and bonded to both sides of the axial legs 25 of one of each pair of L-ring segments 22a and 22b.

Of principal concern in flexible couplings employing an elastomer-to-metal bond is the peeling of the elastomer from the metal. This will most often occur where the line of contact between the two materials is exposed to the tangential shear stresses induced by changes in torque. To overcome what has been an inherent weakness in prior art structures, the present invention provides a semicircular elastomer section 11a and 11b that is bonded to both sides of the legs 25 and is additionally mechanically locked to the ends 29 thereof.

The mechanical locking of the elastomer to the metal legs is accomplished in two ways. The semicircular elastomer sections 11a and 11b are molded with circumferences of slightly greater included angle than the pairs of L-ring segments 22a and 22b to which they are respectively bonded. In other words, the circumferences of L-ring segments are slightly short of being exactly semicircular. In this manner the ends 32 of the elastomer sections 11a and 11b are wrapped around the ends 29 of the L-ring segments, as is best shown in FIG. 3, thereby eliminating direct exposure to the elastomer-metal bond or contact line to peeling, as described above. Additionally, the axially disposed legs 25 to which the elastomer sections are bonded are provided with radial holes 33 closely spaced from the ends 29 thereof. In the molding process, the holes 33 are filled by the elastomer material thereby providing a mechanical locking of the elastomer to the metal supplemental to that attained by wrapping the elastomer around the ends 29.

It will be appreciated that the mechanical locking provided by the elastomer-filled holes 33 will aid in resisting stresses in addition to those imposed by torque variations. A portion of the stresses imposed by axial and parallel misalignment and end float of the shafts 15 is thus also borne by the tensile resistance of the elastomer material in the holes 33 joining the elastomer bonded to opposite sides of the legs 25 or by the shear resistance of the material bearing on the sides of holes 33. This is particularly important when the elastomer bond is weakened by dynamically-induced temperature increases.

The alternate embodiment of the present invention, shown in FIG. 4, is adaptable particularly for use as a spacer coupling in applications where the ends of the shafts lie too far apart to be bridged by a standard coupling of the preferred embodiment. The elastomer sections 11a and 11b and the L-ring segments 22a and 22b, as well as other incidential elements, are the same as in the preferred embodiment shown in FIGS. 1–3 and are numbered correspondingly.

To provide the increased axial spacing, the hubs 112 are modified in form and mounted outwardly of the radial legs 24 of the L-ring segments 22a and 22b. Each hub 112 is provided with an integral peripheral flange 119 positioned to define an axially elongated annular shoulder 120 on its outer face. To facilitate attachment of each hub 112 to its associated pair of L-ring segments 22a and 22b, an annular mounting element 34 is disposed on the inner faces of the radial legs 24 of L-ring segments 22a and 22b. The mounting element 34 has a series of axial tapped holes 35 disposed for alignment with the clearance holes 26 in the legs 24 and clearance holes 128 in the flange 119 for receipt of the cap screws 127 to demountably secure said flange to said legs. The mounting element 34 has an outside diameter small enough to fit inside of the axially disposed legs 25 of the L-ring segments 22a and 22b. The element 34 has a bore 36 having a diameter equal to the inside diameter of the radially disposed legs 24 of the L-ring segments.

The hubs 112 are provided with tapered bores 113 adapted to be mounted to the shafts (not shown) with tapered bushings (not shown) in the same manner as the preferred embodiment. Unlike the hubs 12 of FIGS. 1 and 2, hubs 112 cannot be reversibly mounted to their respective shafts. The bores 113, however, may be oppositely tapered from the manner shown in FIG. 4 for insertion of the tapered bushings from the outer side.

While the invention has been shown and described with reference to particular embodiments thereof, it will be understood by those skilled in the art that various changes may be made in form and detail without departing from the spirit and scope of the invention.

What is claimed is:

1. A flexible coupling for connecting a pair of shafts disposed in substantially aligned end-to-end relation, comprising a hub for each shaft, fastening means securing each hub to its respective shaft, ring means comprising a pair of semicircular segments of L-shaped cross-section for each hub, each of said L-shaped segments having an axially disposed leg and a radially disposed leg, threaded fastening means demountably securing each ring means by its radially disposed leg to its respective hub such that the axially disposed legs extend inwardly of their respective hubs and terminate in opposing spaced relation, and a pair of semicircular elastomer sections each having a medial portion of substantially semicircular cross-section, and each section being of arcuate cross-section having edge portions bonded to said axially disposed legs, the edge portions of said semicircular elastomer sections being flared to provide increased cross-sectional thickness and extend axially from said medial portions to form laterally projecting flanges, the laterally projecting flanges of said edge portions being bonded to both sides and wrapped around the ends of their respective axially disposed legs of said L-ring segments.

2. A coupling as in claim 1 wherein the axially disposed legs of said L-ring segments are provided with circumferentially spaced radial holes so positioned that they are filled by portions of the elastomer of said laterally projecting flanges.

3. A flexible coupling for connecting a pair of shafts disposed in substantially aligned end-to-end relation, comprising a hub for each shaft, fastening means securing each hub to its respective shaft, ring means for each hub, each of said ring means comprising a pair of semicircular segments having axially disposed legs, threaded fastening means demountably securing each ring means to its respective hub such that the axially disposed legs extend inwardly of their respective hubs and terminate in opposing spaced relation, and a pair of semicircular elastomer elements of arcuate cross-section having axially extending flared edge portions bonded to both sides and wrapped around the ends of their respective axially disposed legs of said semicircular ring segments.

4. A coupling as defined in claim 3 wherein the axially disposed legs of said semicircular ring segments are provided with circumferentially spaced radial holes so positioned that they are filled by portions of the elastomer of said axially extending edge portions.

5. A coupling as defined in claim 3 wherein each of said ring means includes an integral radially extending leg for each semicircular segment by which said ring means is secured to its respective hub.

6. A coupling as defined in claim 5 wherein each hub includes a peripheral flange portion defining an annular shoulder on the outer face of said hub, said annular shoulder providing a seat for said radially extending leg, and said peripheral flange portion being adapted to abut the inner face of said radially extending leg and to receive said threaded fastening means.

References Cited

UNITED STATES PATENTS

| 2,896,431 | 7/1959 | Stillwason | 64—11 |
| 2,901,897 | 9/1959 | Reich | 64—13 |
| 2,969,656 | 1/1961 | Reuter | 64—11 |
| 3,250,090 | 5/1966 | Thompson | 64—11 |

FOREIGN PATENTS

| 606,581 | 8/1948 | Great Britain. |

JAMES A. WONG, Primary Examiner

U.S. Cl. X.R.

64—27